May 21, 1957  R. G. McGEE  2,792,592
CLAMPING MECHANISM FOR MOLDING MACHINE
Filed Nov. 8, 1954  2 Sheets-Sheet 1

INVENTOR.
ROBERT G. McGEE
BY *Kenway, Jenney,
Witter & Hildreth*
ATTORNEYS

May 21, 1957 R. G. McGEE 2,792,592
CLAMPING MECHANISM FOR MOLDING MACHINE
Filed Nov. 8, 1954 2 Sheets-Sheet 2

INVENTOR.
ROBERT G. McGEE
BY
ATTORNEYS

United States Patent Office 2,792,592
Patented May 21, 1957

2,792,592
CLAMPING MECHANISM FOR MOLDING MACHINE

Robert G. McGee, Leominster, Mass., assignor to Guy P. Harvey & Son Corp., Leominster, Mass., a corporation of Massachusetts Application November 8, 1954, Serial No. 467,577

9 Claims. (Cl. 18—16)

Presses and the like apparatus having clamping mechanisms embodying toggle links are subject to the disadvantage that their stoke or platen travel is limited by the length of the toggle links, and in order to attain the desired stroke, the toggle links must be lengthened, thereby unduly increasing the size and cost of the press.

The principal object of the present invention is to provide a clamping mechanism embodying toggle links, but which has unlimited stroke in relation to the length of the toggle links and which multiplies the pressure of the operating cylinder greatly in excess of that attributable to the toggle links.

Further objects relate to various features of construction and will be apparent from a consideration of the following description and the accompanying drawings, wherein.

Figure 1:
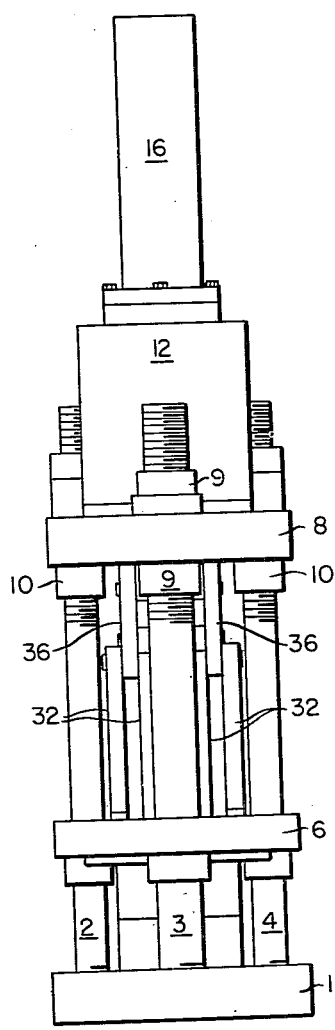
Fig. 1 is a front elevation of a press having a clamping mechanism constructed in accordance with the present invention.

The embodiment herein shown for the purpose of illustration comprises a stationary base 1 defining a fixed platen which supports three upright guide rods or posts 2, 3 and 4, the upper ends of which are threaded. A movable platen 6 is slidably mounted on the guide posts for movement toward and away from the fixed platen 1 and mounted at the upper end portions of the guide posts is a generally rectangular frame-like member 8 which is held in fixed position by adjusting nuts 9 and 10.

Figure 2:
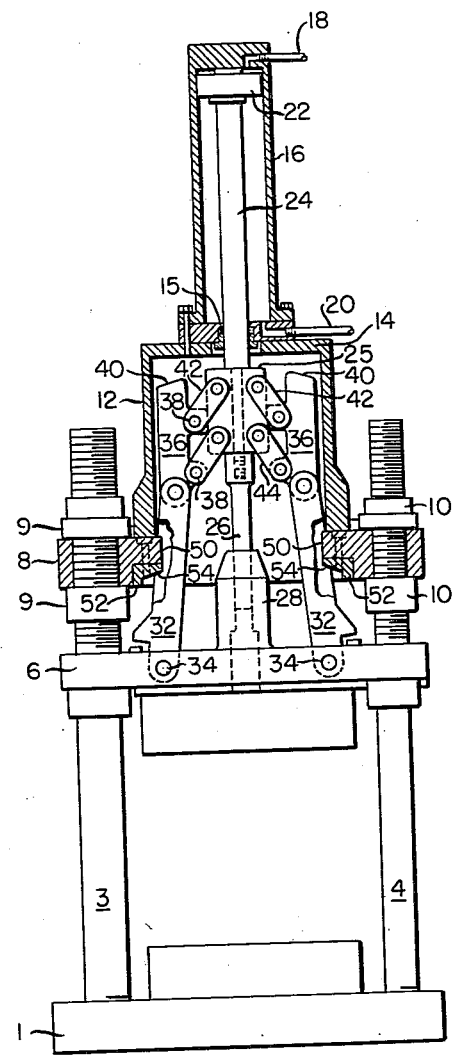
Fig. 2 is a vertical longitudinal section of the press, showing the platen in elevated or open position.

Welded or otherwise secured to the inner marginal portions of the member 8 is the flanged lower end of a housing 12 having a top wall 14 which is provided with a central opening 15 (Fig. 2). Mounted on the wall 14 is a double acting pressure cylinder 16, the opposite ends of which are connected with pipe lines 18 and 20 which in turn are connected with a control valve (not shown) for admitting pressure to one end of the cylinder while exhausting pressure from the other end. Within the cylinder 16 is a piston 22 (Fig. 2) having a downwardly extending piston rod 24 which projects through opening 15 into the interior of the housing 12 and is connected with a clamping mechanism which controls the stroke or travel of the platen 6 and the pressure applied thereto. The clamping mechanism comprises a link block 25 connected to the inner end of the piston rod 24 and a guide rod or extension 26 which projects into a guide 28 integral with the movable platen 6.

Spaced inwardly from the opposite margins of the movable platen 6 are openings which receive the lower ends of four pairs of cooperating links 32 which are pivotally connected to the platen by pins 34. The upper ends of the links 32 are pivotally connected to four intermediate links 36, the inner faces of which are formed with lugs 38. The upper ends of the links 36 are inclined outwardly to provide inclined plates 40, the utility of which is hereinafter pointed out.

The outer ends of four pairs of parallel links 42 and 44 are pivotally connected to the lugs 38 and their inner ends are pivotally connected to the link block 25. The link block 25 and links 36, 42 and 44 define four four-bar or parallel linkage systems which not only maintain the links 36 parallel to piston rod 24, but are also operative to move the links 36 outwardly from retracted position (Figs. 2 and 3) to extended position (Fig. 4) when the movable platen 6 encounters resistance as it moves to closed, locked position.

Figure 4:
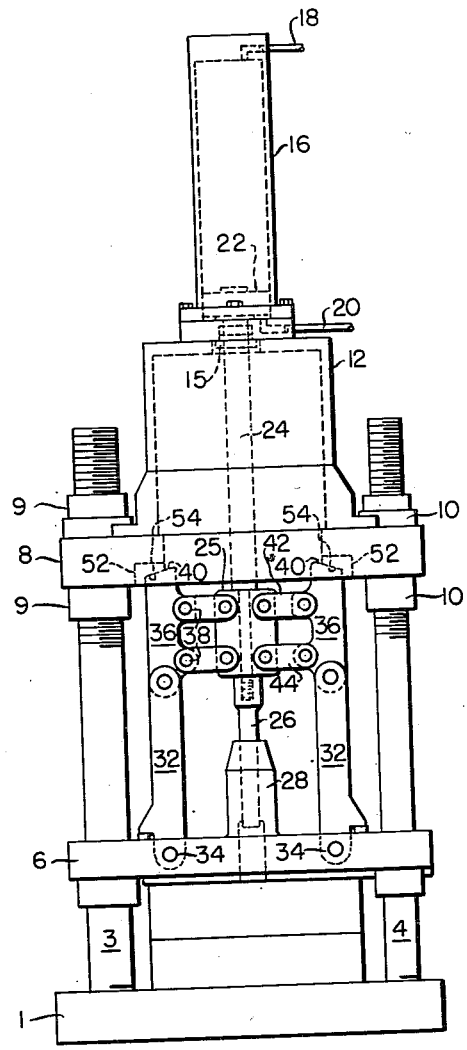
Fig. 4 is a view similar to Fig. 3 showing the platen in locked position.
Figure 3:
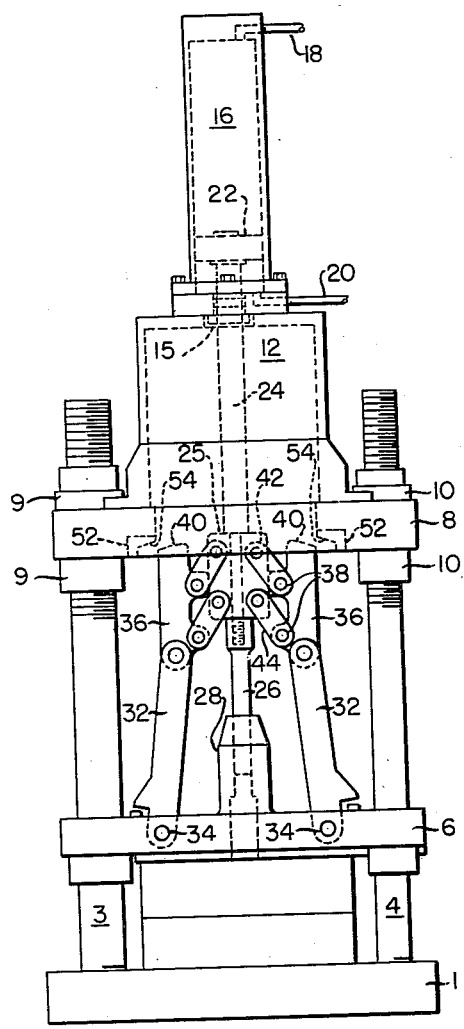
Fig. 3 is a side elevation showing the platen in closed, unlocked position.

Between each set of companion links 32 (Fig. 1) the opposite inner margins of the frame-like member 8 extends inwardly to provide abutments 50 (Figs. 2–4) and the under surfaces of these abutments are recessed to receive hardened inserts 52, the lower surfaces 54 of which slant outwardly to provide inclined planes engageable with the ends 40 of links 36 when swung outwardly from retracted position, wherein their ends are clear of abutments 50 as shown in Fig. 3, to extended or locking positions as shown in Fig. 4. The construction and arrangement of parts are such that when the movable platen 6 travels from open position (Fig. 2) to closed unlocked position (Fig. 3), the links 36 are held in their innermost or retracted position, clear of the abutments 50 and the sidewalls of housing 12, thereby permitting the links 36 and associated parts to be drawn up into the housing 12, as shown in Fig. 2, and thus providing a greater stroke or platen travel than would be possible if the upper ends of the links 36 were fixed as in conventional toggle presses.

When moved from unlocked or retracted position (Fig. 3) to extended or locking position (Fig. 4) the upper ends of the links 36 are anchored against the abutments 50 and each set of links 32, 36 thus provides a pair of toggle links acting on the movable platen 6. The force exerted by the piston rod 24 (acting through the link block 25, parallel links 42, 44, and the toggle links 32, 36) on movable platen 6 is thus generally multiplied and the mechanical advantage is enhanced by the cooperative wedging action of the inclined planes 40 and 54 attributable to the outward lateral movement of the links 36. Hence, the force exerted by the movable platen is generally in excess of that attributable to the toggle links alone.

A summary of a complete operating cycle of the press is as follows:

Assuming that the press is open as shown in Fig. 2, that the member 8 is adjusted so that the abutments 50 are in position to produce the maximum operating pressure, and that the line 20 is connected with the exhaust of the control valve, fluid pressure is admitted to the line 18 which causes the piston rod, movable platen and associated parts to move downwardly to closed, unlocked position (Fig. 3). Since the platen 6 encounters no resistance in its travel to closed, locked position, the links 36 are held in retracted position (Figs. 2 and 3), but when the platen 6 encounters resistance due to engagement with or the closing of the sections of a mold or die, further downward travel of the piston rod 24 causes the links 36 to move outwardly from retracted position (wherein their free ends 40 are inwardly of the abutments 50 as shown in Fig. 3) to extended or locking position (wherein their free ends engage the abutments 50). As the links 36 travel from retracted to extended position the inclined surfaces 40 and 54 are brought into contact and a combined toggle and wedging action simultaneously takes place which greatly multiplies the force exerted by the piston rods.

When fluid pressure is applied to the line 20 and the line 18 is connected to the exhaust of the control valve, the piston rod moves upwardly, carrying the platen 6, toggle links and associated parts. The upward pull of the piston rod on the links 38 causes the links 36 to move inwardly to retracted position clear of abutments 50 so that these links and associated parts may be drawn into the housing 12, as shown in Fig. 2, thus completing the operating cycle.

The above described operation may be effected manually or automatically, but in either case it is to be understood that conventional fluid pressure control may be employed. It is also to be understood that this disclosure is for the purpose of illustration and that various changes and modifications may be made without departing from the spirit and scope of the invention as set forth in the appended claims.

I claim:

1. A press having a fixed platen, a movable platen, and a clamping mechanism comprising a fixed abutment above said movable platen, an operating rod reciprocable toward and away from said fixed platen, a pair of toggle links, one of which is pivotally connected to said movable platen and the other toggle link being movable from a position inwardly of said abutment outwardly so that its free end engages said abutment, and link means connecting the end of said operating rod and said other toggle link so that when said operating rod moves toward said fixed platen the free end of said other toggle link is first swung into engagement with said abutment and thereafter cooperate with the first link in exerting a combined wedging and toggle action on said movable platen as it approaches the limit of its movement towards said fixed platen, and when said operating rod moves away from said fixed platen, said free end is swung inwardly so that said movable platen and toggle links move away from said fixed platen.

2. A press having a fixed platen, a movable platen, and a clamping mechanism comprising a fixed abutment above said movable platen, an operating rod reciprocable toward and away from said fixed platen, a pair of toggle links, one of which is pivotally connected to said movable platen and the other toggle link being movable from a position inwardly of said abutment outwardly so that its free end engages said abutment, and a pair of parallel links connecting the end portion of said operating rod and said other toggle link so that when said operating rod moves toward said fixed platen the free end of said other toggle link is first swung into engagement with said abutment and thereafter cooperate with the first link in exerting a combined wedging and toggle action on said movable platen as it approaches the limit of its movement towards said fixed platen, and when said operating rod moves away from said fixed platen, said free end is swung inwardly so that said movable platen and toggle links move away from said fixed platen.

3. A press as set forth in claim 1, wherein the engaging surface of said abutment provides an inclined plane against which said free end of said other toggle link acts to enhance the mechanical advantage of said clamping mechanism.

4. A press as set forth in claim 1, wherein said free end of said other toggle link is shaped to provide an inclined plane acting on said abutment so as to enhance the mechanical advantage of said clamping mechanism.

5. A press as set forth in claim 1, wherein the engaging surface of said abutment and the free end of said other toggle link are shaped to provide cooperating inclined planes effective to enhance the mechanical advantage of said clamping mechanism.

6. In a press having a fixed platen, guiding means mounted on said fixed platen, and a movable platen mounted on said guiding means for movement toward and away from said fixed platen, clamping mechanism comprising a fixed abutment carried by said guiding means outwardly of said movable platen, an operating rod mounted for reciprocatory movement toward and away from said fixed platen, a pair of toggle links one of which is pivotally connected to said movable platen, the other toggle link being movable when said movable platen approaches the limit of its movement toward said fixed platen from a released position, wherein its free end is held inwardly of the abutment, to a locking position, wherein said free end is held in engagement with said abutment, thereby to cooperate with the first link in exerting a combined wedging and toggle action on said movable platen as it approaches the limit of its movement toward said fixed platen, and a pair of parallel links connecting the end portion of said operating rod and said other toggle link so as to move said other toggle link to and from locking position in response to reciprocatory movement of said operating rod.

7. In a press having a fixed platen, guiding means mounted on said fixed platen, and a movable platen mounted on said guiding means for movement toward and away from said fixed platen, clamping mechanism comprising a fixed abutment carried by said guiding means outwardly of said movable platen, an operating rod mounted for reciprocatory movement toward and away from said fixed platen, a pair of toggle links one of which is pivotally connected to said movable platen, the other toggle link being movable when said movable platen approaches the limit of its movement toward said fixed platen from a released position, wherein its free end is held inwardly of the abutment, to a locking position wherein said free end is held in engagement with said abutment, thereby to cooperate with the first link in exerting a combined wedging and toggle action on said movable platen as it approaches the limit of its movement toward said fixed platen, and a pair of parallel links connecting the end portion of said operating rod and said other toggle link so as to move said other toggle link to and from locking position in response to reciprocatory movement of said operating rod, said links being effective in response to movement of said operating rod away from said fixed platen to draw said toggle links inwardly clear of said abutment so that they may be carried outwardly of said abutment, thereby to lengthen the travel of the movable platen.

8. A press as set forth in claim 6, wherein said fixed abutment is adjustable lengthwise of said guiding means.

9. A press as set forth in claim 6, wherein at least one of the contacting surfaces of said abutment and free end of said other toggle link provide an inclined plane effective to enhance the mechanical advantage of said clamping mechanism.

References Cited in the file of this patent

UNITED STATES PATENTS

| | | |
|---|---|---|
| 2,416,348 | Renier | Feb. 25, 1947 |
| 2,585,297 | Beuscher | Feb. 12, 1952 |